May 20, 1941.  H. T. KRAFT  2,242,430
METHOD OF BALANCING TIRES
Filed Sept. 7, 1939
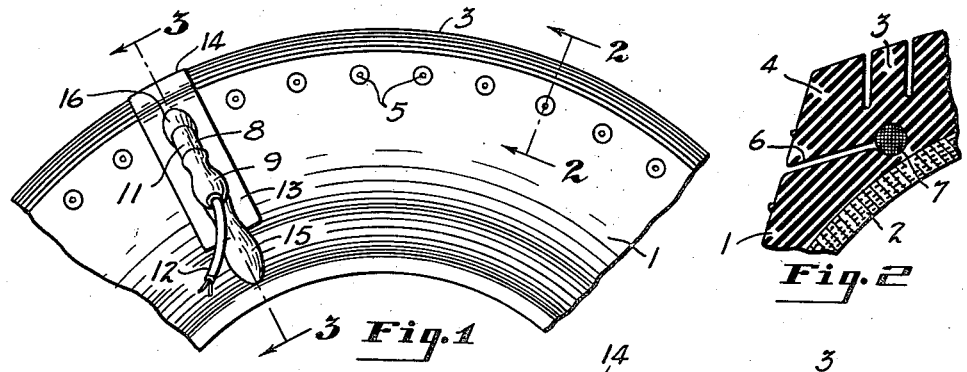
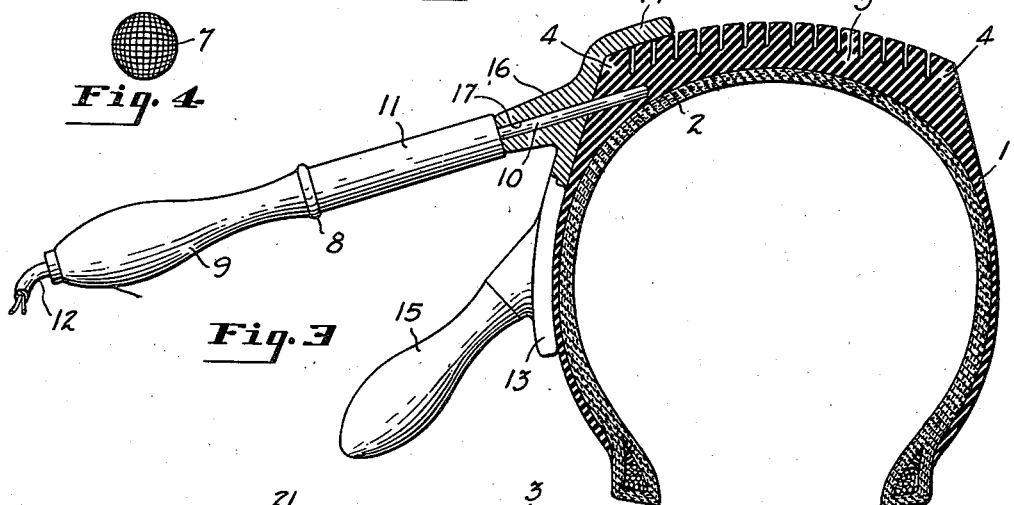
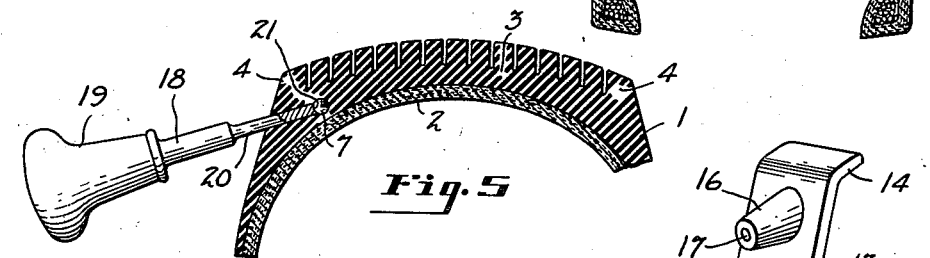
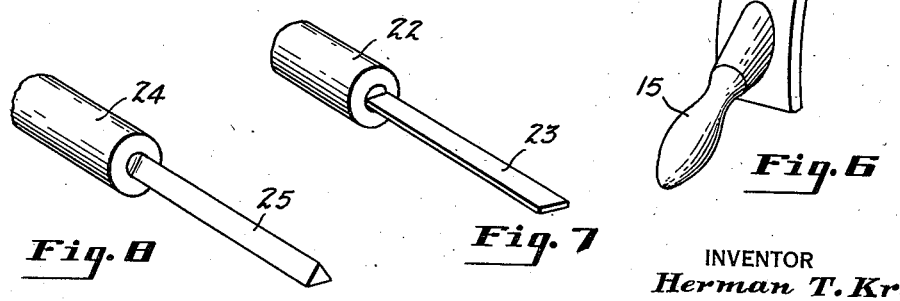
INVENTOR
*Herman T. Kraft*
BY
*Evans + McCoy*
ATTORNEYS Patented May 20, 1941

2,242,430

UNITED STATES PATENT OFFICE 2,242,430

METHOD OF BALANCING TIRES

Herman T. Kraft, Akron, Ohio, assignor to The General Tire & Rubber Company, Akron, Ohio, a corporation of Ohio Application September 7, 1939, Serial No. 293,771

3 Claims. (Cl. 154—14)

This invention relates to rubber tires and to a method of balancing such a tire by which a substantially uniform distribution of weight about the axis of the tire is obtained.

In the manufacture of pneumatic tires it is found that most of the tires are not perfectly uniform and that some portions thereof are somewhat heavier than others, with the result that when mounted upon a wheel and rotated at high speeds, the centrifugal force is not uniform throughout the tire periphery and the vehicle wheel is imperfectly balanced. Uniform distribution of weight in the wheel and tire is desirable for easy riding, economy of power and uniform wear on the tires.

It has heretofore been proposed to balance rubber tired wheels by attaching weights at selected points on the tire supporting rim, but such weights are unsightly and do not fully compensate for inequalities in the tire because of the fact that they are placed at a considerable distance from the tire periphery.

The present invention has for its object to balance a tire by the insertion of weights into selected portions of the tire tread in such manner as to enclose the weights within the body of rubber forming the tire tread.

The present invention has for a further object to provide a simple and inexpensive method of inserting weights, for example, slugs of a heavy metal such as lead or lead alloy, into shoulder portions of the tire tread in such manner that the slugs are permanently secured in place entirely within the rubber of the tread.

With the above and other objects in view, the invention may be said to comprise the balanced tire and method of balancing the same as illustrated in the accompanying drawing hereinafter described and particularly set forth in the appended claims, together with such variations and modifications thereof as will be apparent to one skilled in the art to which the invention appertains. Reference should be had to the accompanying drawing forming part of this specification, in which:

Figure 1 is a fragmentary side elevation showing a tire with a jig and perforating tool in place thereon;

Fig. 2 is a fragmentary section on an enlarged scale through a tread shoulder showing a metal slug in place therein;

Fig. 3 is a transverse section through the tire showing a jig placed on the tire and a perforating tool inserted to full depth into the tread shoulder;

Fig. 4 is a view showing one of the metal slugs on an enlarged scale;

Fig. 5 is a fragmentary sectional view showing the manner of inserting the slugs in the holes previously formed by the perforating tool;

Fig. 6 is a perspective view of the jig;

Fig. 7 is a perspective view of an alternative form of perforating tool; and

Fig. 8 is a perspective view showing another form of perforating tool.

In the accompanying drawing the invention is shown applied to a pneumatic tire 1 which has a fabric carcass 2 and rubber tread 3 which has radially deep shoulder portions 4. The method of the present invention consists in balancing a tire by inserting slugs of heavy metal into the body of rubber which forms the tread in portions of the tire which are light as compared to other portions of the tire, the points at which the slugs are to be inserted being ascertained by suitable balance indicating devices well known in the art. After the portions of the tire which are deficient in weight have been ascertained, weight is added to these portions by forming holes of small cross section extending inwardly into a shoulder portion of the tire from the side face thereof, after which a slug of heavy metal of a cross sectional size greater than that of the hole is forced into the hole to the inner end thereof, a suitable number of slugs being inserted in the selected portions of the tire tread to substantially balance the tire.

In order to enable the holes to be made in the sides of the tread shoulders without detracting from the appearance of the tire, a series of regularly spaced indentations of circular or other form, such as indicated by the numeral 5 in Fig. 1, may be molded on the side faces of the tire shoulders. By forming the holes in the selected portions of the tire at the depressions, the holes will not be noticeable.

As shown in Fig. 2 of the drawing, holes 6 of small cross section are formed in the shoulder portions 4 of the tire. These holes extend inwardly into the shoulder from a point spaced inwardly from the tread surface. After the hole 6 is formed, a metal slug 7, which is preferably of substantially spherical form and of a diameter considerably greater than that of the hole 6, is forced into the hole to the inner end thereof. The rubber surrounding the slug 7 is put under compression and firmly holds the slug in place within the tire tread.

As best shown in Fig. 3, a perforating tool 8 is provided which has a handle 9 to which is attached a rod 10 of small diameter. The rod 10 is adapted to be heated electrically, the tool being provided with a sleeve 11 enclosing the inner end of the rod 10 in which suitable resistance heating elements may be placed. Current for heating the rod is supplied through a suitable extension cord 12.

In order to properly position the perforating tool and to accurately gauge the depth of the holes formed by the tool, a suitable jig 13 is provided, the body portion which is formed to fit against a side face of the tire. The jig 13 has a flange 14 which engages upon the peripheral surface of the tread and a handle 15 by means of which the jig may be held in position on the tire. The jig is provided with a boss 16 which has a central hole 17 in which the rod 10 has a sliding fit. In forming the holes in the tire shoulders the jig 13 is placed upon the tire and the rod 10 is inserted into the hole 17 of the jig and pushed inwardly until the end of the sleeve 11 engages the boss 16, whereupon the rod 10 is immediately withdrawn. The heated rod readily enters the rubber of the tire shoulder and when withdrawn leaves an opening in the rubber which is of a diameter considerably less than the rod. After a hole 6 is formed in the tire shoulder, one of the metal slugs 7 is inserted into the hole by means of a suitable tool 18 which has a handle 19 and a rod 20 attached thereto which is provided with a concave end 21. The slug 7 is placed at the outer end of the opening and is engaged by the concave end 21 of the rod 20, which is then pushed into the hole 6 by means of the handle 19.

In order to prevent trapping of air in the hole 6 between the inner end of the hole and slug 7, and in order to more securely hold the slug in place after it is inserted in the hole, the slug, as shown in Fig. 4, is preferably provided with a surface which has been roughened in any suitable way, as, for example, by knurling.

The perforating rod may be round in cross section, as shown in Fig. 3, or it may have other shapes in cross section. The perforating tool 22 shown in Fig. 7 is provided with a flat rod 23, and the perforating tool 24 shown in Fig. 8 is provided with a rod 25 which is triangular in cross section. The flat or triangular rods have the advantage that there is somewhat less tendency to trap air behind the slug when it is inserted into the hole.

In forming the hole 6 the jig 13 is placed with its hole 17 directly over one of the molded indentations 5 in the tire shoulder so that after the hole is formed it will require close inspection to see the hole because of the general similarity of the hole to the regularly spaced indentations already formed in the tire.

As shown in Figs. 2 and 3 of the drawing, the holes 6 are so formed that they are entirely within the rubber of the tire shoulder outwardly of the tire carcass but within the grooves or depressions of the tire tread. The holes 6 preferably are inclined outwardly toward the tread periphery so as to position the holes at a distance from the tread surface such that rubber in which the holes are located will remain after the tread ribs or blocks have worn away.

The present invention provides a very simple and economical method of balancing tires which is highly effective because of the fact that the weight is added to the tire adjacent the periphery thereof and in such manner that the added weight may be distributed advantageously over considerable portions of the tire periphery.

Furthermore, it is to be understood that the particular procedure set forth is presented for purposes of explanation and illustration and that various modifications of said procedure can be made without departing from my invention as defined in the appended claims.

What I claim is:

1. The herein described method of balancing a rubber tire which consists in forming in a selected portion of the tread periphery one or more holes of small cross section extending laterally into the rubber of the tire tread, and forcing into said holes slugs of metal of a cross sectional size greater than the holes.

2. The herein described method of balancing a rubber tire which consists in forming in a selected portion of the tread periphery one or more holes of small cross section extending from a side face of a tire shoulder and at an outward inclination, and passing a metal slug of a cross sectional size greater than the hole into each hole to adjacent the inner end thereof.

3. The herein described method of balancing a rubber tire which consists in forming in a selected portion of the tread periphery one or more holes of small cross section extending laterally into the rubber of the tire tread by forcing a heated rod endwise into the tire tread and immediately withdrawing the rod, and pushing a metal slug of a cross sectional size greater than the hole into each of the holes so formed.

HERMAN T. KRAFT.